(12) United States Patent
Halbur et al.

(10) Patent No.: US 7,784,686 B2
(45) Date of Patent: Aug. 31, 2010

(54) TRANSACTION CARD WITH ENCLOSED CHAMBER

(75) Inventors: Ted C. Halbur, Lino Lakes, MN (US); Shawn P. Boyd, St. Paul, MN (US); Timothy Schumann, Arden Hills, MN (US); Erin M. Borkowski, Andover, MN (US); John Tomczyk, Shoreview, MN (US)

(73) Assignee: Target Brands, Inc., Minneapolis, MN (US)

( * ) Notice: Subject to any disclaimer, the term of this patent is extended or adjusted under 35 U.S.C. 154(b) by 425 days.

(21) Appl. No.: 11/965,475

(22) Filed: Dec. 27, 2007

(65) Prior Publication Data

US 2009/0166433 A1    Jul. 2, 2009

(51) Int. Cl.
*G06K 5/00* (2006.01)
(52) U.S. Cl. .................... 235/380; 235/487; 235/375
(58) Field of Classification Search ................ 235/380, 235/379, 487, 492, 375; 705/41
See application file for complete search history.

(56) References Cited

U.S. PATENT DOCUMENTS

| | | |
|---|---|---|
| 0,559,609 A | 5/1896 | Roescher |
| 1,038,057 A | 9/1912 | Younger |
| 1,118,370 A | 11/1914 | Russell |
| 1,130,782 A | 3/1915 | Willens |
| 1,138,737 A | 5/1915 | Dunham |
| 1,194,853 A | 8/1916 | McCormack |
| 1,333,686 A | 3/1920 | Spotswood |
| 1,379,861 A | 5/1921 | Goldmann |
| 1,455,179 A | 5/1923 | Ward |
| 1,665,894 A | 4/1928 | Reichard |
| 1,764,063 A | 6/1930 | Youngberg |
| 2,101,592 A | 12/1937 | Ogg |
| 2,536,155 A | 1/1951 | Brand |
| 2,545,804 A | 3/1951 | Butler |
| 2,631,395 A | 3/1953 | Barker |

(Continued)

FOREIGN PATENT DOCUMENTS

GB    2277482 A    11/1994

OTHER PUBLICATIONS

Lindahl et al., "Financial Transaction Card With Visual Effect," U.S. Appl. No. 11/1645,143, filed Dec. 22, 2006, 35 pages.

(Continued)

*Primary Examiner*—Edwyn Labaze
(74) *Attorney, Agent, or Firm*—Griffiths & Seaton PLLC

(57) ABSTRACT

A transaction card includes a chambered member, a cover substrate and an account identifier. The chambered member defines a rear surface, a front surface and a chamber extending from the front surface toward the rear surface. The front surface and the rear surface are sized similarly to each other. The cover substrate defines a first surface, which is securely coupled to the front surface to enclose the chamber, and a window aligned with the chamber. The window is one of translucent and transparent such that at least a portion of the chamber is viewable through the window. The account identifier is connected to the chambered member and links the transaction card to at least one of an account and a record. Other embodiments, stored-value cards and associated methods are also disclosed.

23 Claims, 9 Drawing Sheets

U.S. PATENT DOCUMENTS

| | | | |
|---|---|---|---|
| 3,103,080 A | 9/1963 | Desmond |
| 3,399,473 A | 9/1968 | Jaffe |
| 3,624,938 A | 12/1971 | Richard |
| 3,686,480 A | 8/1972 | Bowerman |
| 3,732,640 A | 5/1973 | Changnon |
| 3,894,756 A | 7/1975 | Ward |
| D238,906 S | 2/1976 | Cone, II |
| 4,043,055 A | 8/1977 | Zegel |
| 4,078,320 A | 3/1978 | Christ |
| 4,100,689 A | 7/1978 | Broune |
| 4,237,634 A | 12/1980 | Pokhis |
| 4,597,743 A | 7/1986 | Becker et al. |
| 4,776,686 A | 10/1988 | Stanley et al. |
| 4,804,133 A | 2/1989 | Kiyokane |
| D310,386 S | 9/1990 | Michels et al. |
| 4,958,455 A | 9/1990 | Jacobsen |
| 5,152,090 A | 10/1992 | Jacobsen |
| 5,328,026 A | 7/1994 | Newman |
| 5,412,199 A | 5/1995 | Finkelstein et al. |
| 5,669,165 A | 9/1997 | Santorsola |
| D386,399 S | 11/1997 | Stokely et al. |
| 6,085,451 A | 7/2000 | Riehle |
| 6,193,163 B1 | 2/2001 | Fehrman et al. |
| 6,305,609 B1 | 10/2001 | Melzer et al. |
| 6,390,372 B1 | 5/2002 | Waters |
| 6,484,425 B1 | 11/2002 | Hirsch |
| 6,832,730 B2 | 12/2004 | Conner et al. |
| 6,871,432 B2 | 3/2005 | Lacroix |
| D510,595 S | 10/2005 | Cook, Jr. |
| 7,025,655 B2 | 4/2006 | Chase |
| D523,076 S | 6/2006 | Lauer et al. |
| D526,012 S | 8/2006 | Dorr et al. |
| 7,117,990 B2 | 10/2006 | Sarif |
| D547,396 S | 7/2007 | Yaguchi |
| 7,264,155 B2 | 9/2007 | Halbur et al. |
| 2002/0143697 A1 | 10/2002 | Gotfried |
| 2003/0201331 A1 | 10/2003 | Finkelstein |
| 2007/0063054 A1* | 3/2007 | Holme ........................ 235/487 |
| 2007/0266605 A1 | 11/2007 | Halbur et al. |
| 2008/0083145 A1 | 4/2008 | Wynalda, Jr. et al. |

OTHER PUBLICATIONS

Various views of the "let it snow" gift card publicly offered for sale by Borders book stores at least as early as Nov. 2007, 1 page.

Various views of the "Join in the Reindeer Games" gift card publicly offered for sale by Best Buy stores at least as early as Nov. 2007, 2 pages.

Wooden Postcards: "Part 2—Vintage Cards," www.postcardy.com/article13.html, available at least as early as Feb. 11, 2007 per the Internet archive available at www.archive.org, 11 pages.

* cited by examiner

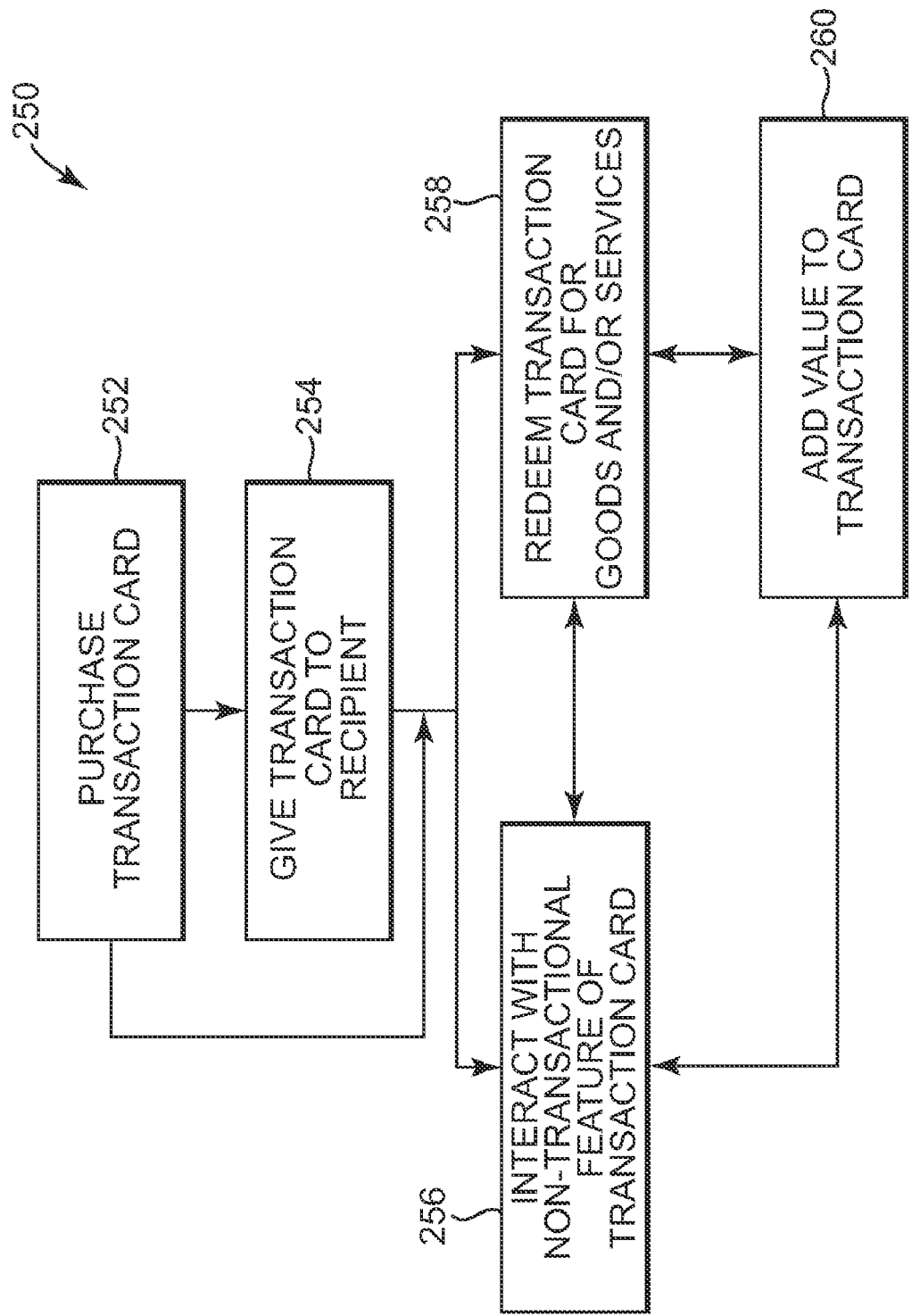

TRANSACTION CARD WITH ENCLOSED CHAMBER

BACKGROUND OF THE INVENTION

Transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction card including a chambered member, a cover substrate and an account identifier. The chambered member defines a rear surface, a front surface, which is opposite the rear surface, and a chamber extending from the front surface toward the rear surface. The front surface and the rear surface are sized similarly to each other. The cover substrate defines a first surface, which is securely coupled to the front surface of the chambered member to enclose the chamber, and a window aligned with the chamber. The window is one of translucent and transparent such that at least a portion of the chamber is viewable through the window. The account identifier is connected to the chambered member and links the transaction card to at least one of an account and a record. The account identifier is machine readable by a point-of-sale terminal. Methods of providing a transaction card and other embodiments of stored-value or financial transaction cards and associated assemblies are also disclosed.

BRIEF DESCRIPTION OF THE DRAWINGS

Embodiments of the invention will be described with respect to the figures, in which like reference numerals denote like elements, and in which:

FIG. 11 is a flow chart illustrating a method of using a transaction card, according to one embodiment of the present invention.

DETAILED DESCRIPTION

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction card is adapted for making purchases of goods and/or services from, e.g., a retail store or website. According to one embodiment, an original consumer buys the transaction card to give a recipient who in turn is able to use the transaction card at a retail store or setting to pay for goods and/or services. The transaction card, according to embodiments of the present invention, provides the consumer and recipient with amusement in addition to the ability to pay for goods and/or services with the transaction card.

In one example, transaction cards according to embodiments of the present invention include a chamber securely enclosed therein and one or more articles maintained within the chamber. Each of the one or more articles is sized smaller than the chamber such that upon movement of the transaction card, the one or more articles visibly move within the chamber to the amusement of the bearer. In one embodiment, more than one such chamber is securely enclosed within the transaction card. In one example, each of the chambers is positioned to appear as an eye or other feature of a character or scene depicted on the front of the transaction card, and the one or more items appear as a pupil or iris of the eye. As such, the chamber and one or more items form a "googly eye" of the character or scene depicted by the transaction card. This amusing feature of the transaction card promotes sale and gifting of the transaction card.

Figure 1:
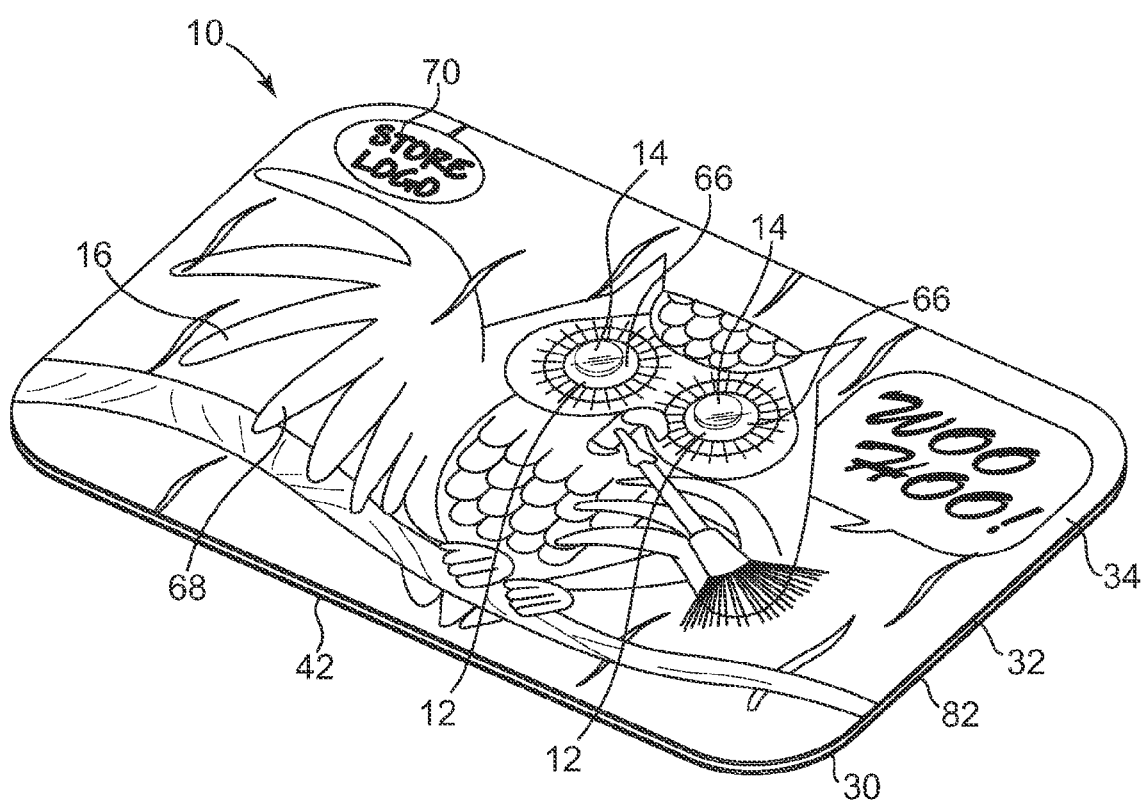
FIG. 1 is a perspective view illustration of a transaction card, according to one embodiment of the present invention.
Figure 2:
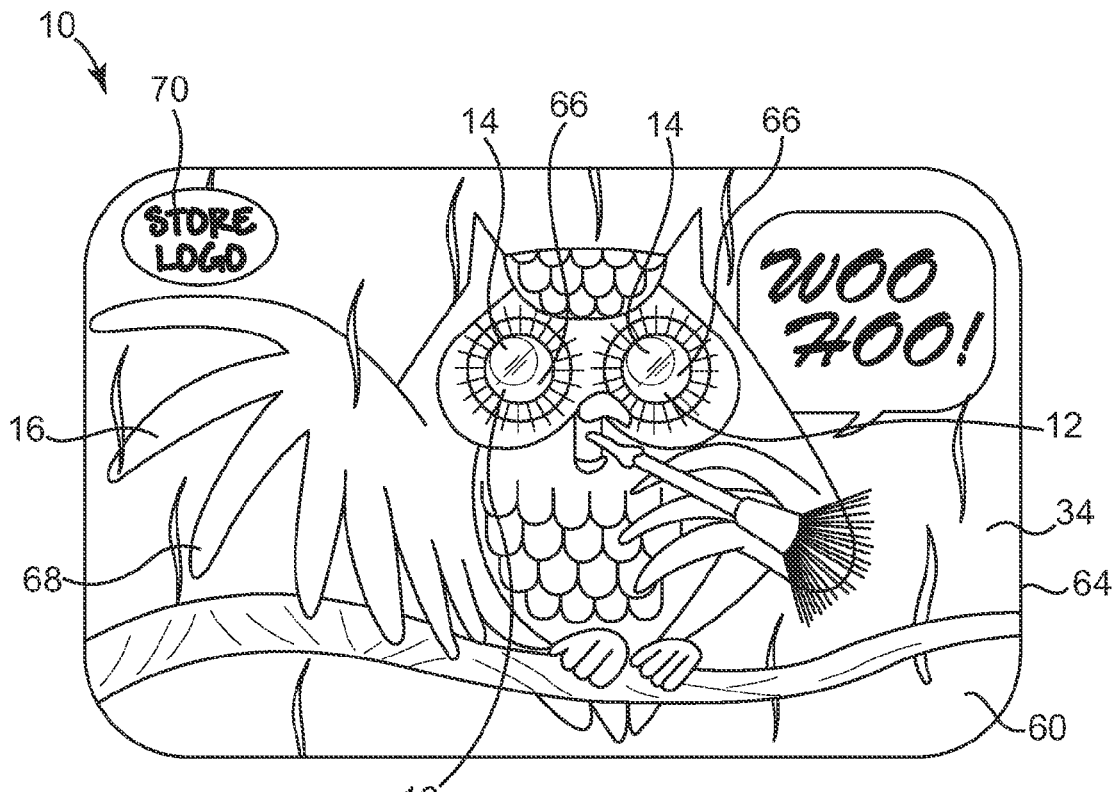
FIG. 2 is a front view illustration of the transaction card of FIG. 1.
Figure 3:
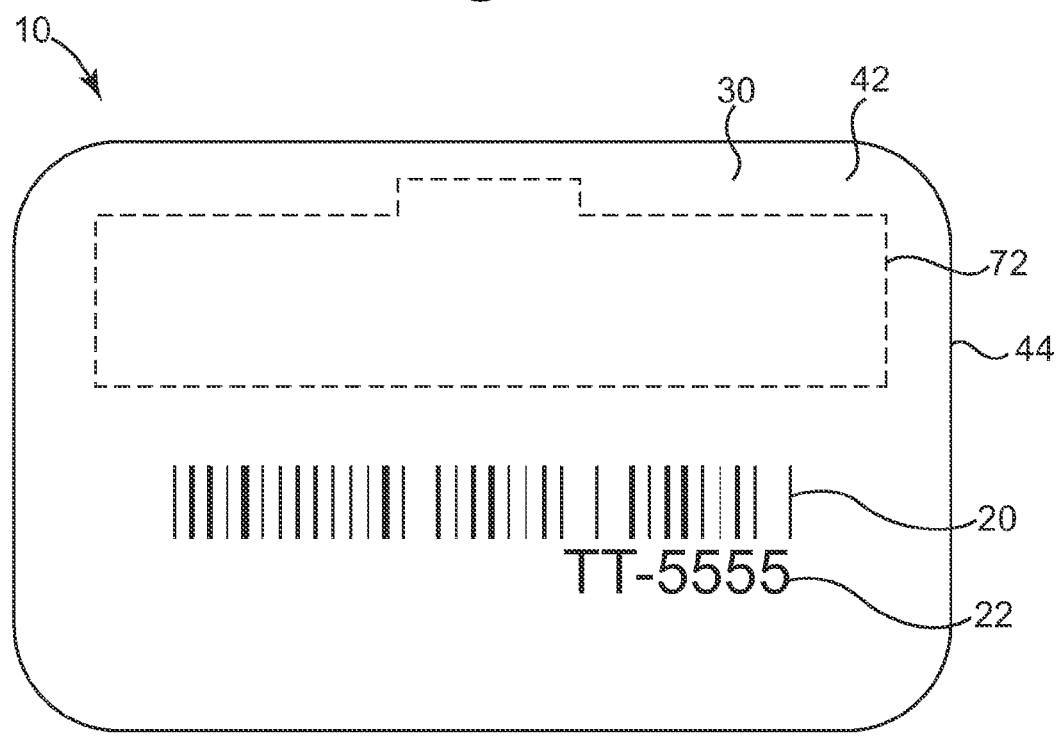
FIG. 3 is a rear view illustration of the transaction card of FIG. 1.
Figure 4:
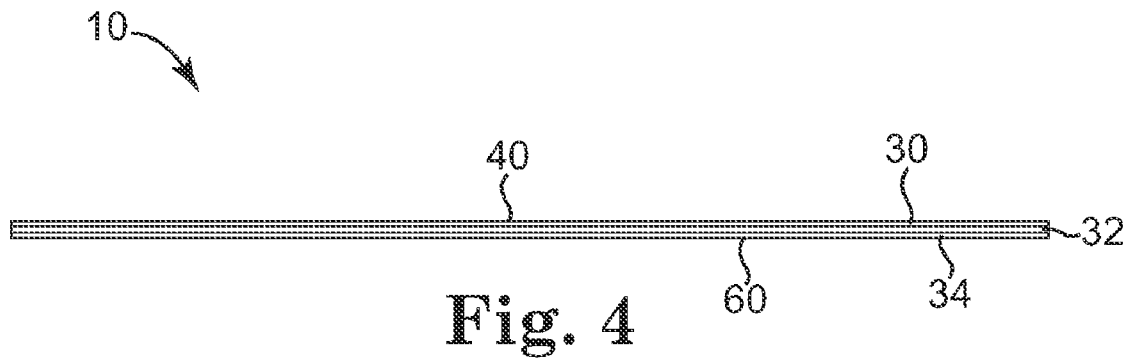
FIG. 4 is a top view illustration of the transaction card of FIG. 1; the bottom view illustration being a mirror image thereof.
Figure 5:
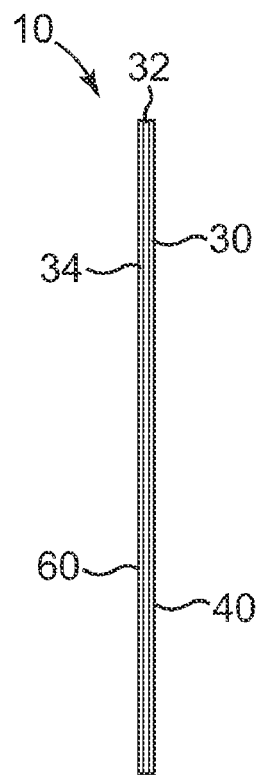
FIG. 5 is a right side view illustration of the transaction card of FIG. 1; the left side view illustration being a mirror image thereof.

Turning to the figures, FIGS. 1-5 illustrate various views of one embodiment of a transaction card 10 (e.g., a stored-value card or other financial transaction product) defining at least one compartment or chamber 12, which is generally indicated in FIGS. 1 and 3, fully enclosed therein. In one embodiment, following assembly of transaction card 10, the at least one chamber 12 is viewable but not readily accessible by a bearer of transaction card 10. One or more movable articles or items 14 may be permanently stored within each chamber 12. In one embodiment, each item 14 is readily moveable within the respective chamber 12 such that when transaction card 10 is shaken or otherwise moved, each item 14 can be viewed as moving within the confines of the respective chamber 12.

In one embodiment, transaction card 10 includes indicia 16 corresponding with the position of the at least one chamber 12 in a manner configured to provide the visual impression that each visible chamber 12 is an eye or other feature of a fictional or non-fictional character or scene depicted by indicia 16. In one example, one item 14 is maintained within each chamber 12 and appears as a pupil and/or iris of the eye. As such, upon shaking or otherwise moving transaction card 10, each item 14 moves within the respective chamber 12 in a manner appearing to the bearer of transaction card 10 as pupils/irises moving within a respective eye of the character, which, in turn, amuses the bearer.

Referring to the rear view illustration of FIG. 3, transaction card 10 includes at least one account activation area or account identifier 20, such as a bar code, a magnetic strip, a smart chip or other electronic device, a radio frequency identification (RFID) device or other suitable identifier readily machine readable by a point-of-sale terminal, account access station, kiosk or other suitable device. In one embodiment where account identifier 20 is machine readable, account identifier 20 is also readable by a bearer of transaction card 10 such that transaction card 10 can be used when a machine configured to read transaction card 10 is not present (e.g., when using transaction card 10 to make a purchase on a web site).

Account identifier 20 indicates a financial or other stored-value account or record to which transaction card 10 is linked. The account or record of the monetary value, points, minutes or other balance associated with transaction card 10 optionally is maintained on a database, other electronic or manual record-keeping system or, in the case of "smart" cards for example, on a chip or other electronic device on/in transaction card 10 itself. Accordingly, by scanning account identifier 20, the account or record linked to transaction card 10 is identified and can subsequently be activated, have amounts debited therefrom, and/or have amounts credited thereto.

In one embodiment, account identifier 20 includes a character string or code 22 (e.g., a number and/or letter string) configured to provide additional security to the user of transaction card 10 and/or configured to be read by a bearer of transaction card 10 to facilitate use of transaction card 10 for web site or other purchases outside of brick-and-mortar type retail establishments. With the above in mind, account identifier 20 is one example of means for linking transaction card 10 with an account or record, and scanning of account identifier 20 is one example of means for activating or loading value on transaction card 10.

Transaction card 10 may form the at least one chamber 12 in any suitable manner. In one example, as illustrated with reference to FIG. 6, transaction card 10 includes a first or base substrate 30, a second or intermediate substrate 32 and a third or cover substrate 34 sequentially layered on one another (as such, each substrate 30, 32 and 34 may alternatively be considered a layer of transaction card 10). Each of base substrate 30, intermediate substrate 32 and cover substrate 34 are substantially planar and are formed with a similar outer shape and perimeter size. In one embodiment, base substrate 30, intermediate substrate 32 and cover substrate 34 are each substantially rectangular in shape, and/or are each similarly sized to an identification card, a credit card or other card sized to fit in a wallet of a card bearer (i.e., are wallet sized). In particular, in one embodiment, the overall dimensions of each of base substrate 30, intermediate substrate 32 and cover substrate 34 are about 8.5 cm wide by about 5.5 cm tall. In other embodiments, one or more of base substrate 30, intermediate substrate 32 and cover substrate 34 are otherwise shaped as a square, circle, oval, star or any other suitable shape.

Each of base substrate 30, intermediate substrate 32 and cover substrate 34 is formed of any suitable material such as a somewhat rigid yet flexible material similar to that commonly used for identification cards, credit cards, etc. For example, one or more of base substrate 30, intermediate substrate 32 and cover substrate 34 may be formed of a paper-based, plastic-based, composite or other suitable material.

Figure 6:
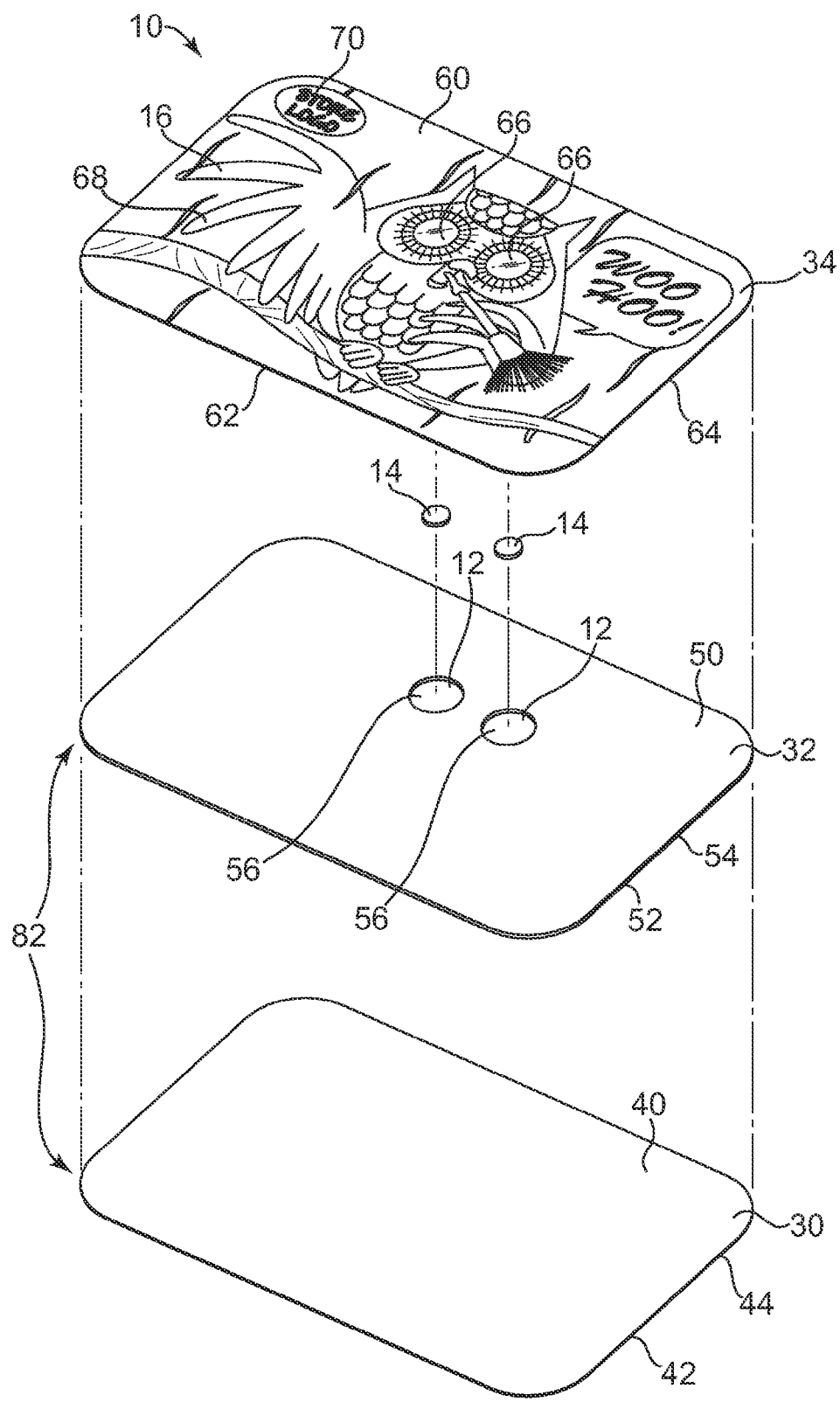
FIG. 6 is an exploded perspective view illustration of the transaction card of FIG. 1, according to one embodiment of the present invention.

Referring to FIG. 6, in one embodiment, base substrate 30 is substantially planar and defines a front surface 40 (e.g., a first major and/or planar surface), a rear surface 42 (e.g., a second major and/or planar surface) opposite front surface 40 and an outer perimeter 44. In one example, base substrate 30 is substantially solid with no apertures or cavities being formed therein. In one example, base substrate 30 or at least a portion of rear surface 42 of base substrate 30 is substantially opaque and is printed with or otherwise includes account identifier 20. While the terms "front" and "rear" are used herein with respect to the orientation of FIGS. 1-6, it should be understood that transaction card 10 may be considered in a different manner such that surface 42 illustrated in FIG. 3 may be considered a front surface, surface 60 illustrated in FIG. 2 may be considered rear surface, etc.

In one embodiment, intermediate substrate 32 is substantially planar and defines a front surface 50 (e.g., a first major and/or planar surface), a rear surface 52 (e.g., a second major and/or planar surface) opposite front surface 50 and an outer perimeter 54. In one example, intermediate substrate 32 defines one or more apertures 56 extending entirely through intermediate substrate 32 (i.e., from front surface 50 to rear surface 52). In one embodiment, intermediate substrate 32 defines two apertures 56 positioned relatively near to one another. In one embodiment, intermediate substrate 32 is substantially thicker than base substrate 30 and/or cover substrate 34. In one example, intermediate substrate 32 is at least twice the thickness of base substrate 30 and/or at least twice the thickness of cover substrate 34.

In one embodiment, cover substrate 34 is substantially planar and defines a front surface 60 (e.g., a first major and/or planar surface), a rear surface 62 (e.g., a second major and/or planar surface) opposite front surface 60 and an outer perimeter 64. In one example, cover substrate 34 is substantially solid with no apertures or cavities being formed therein. In one embodiment, cover substrate 34 defines one or more window 66 or see-through portions (as compared to a remainder or non see-through portion(s) of cover substrate 34) that are each one of translucent and transparent. In one embodiment, each window 66 is positioned relative to outer perimeter 64 of base substrate 30 in a similar manner as apertures 56 are positioned relative to outer perimeter 54 of intermediate substrate 32. In one embodiment, cover substrate 34 with window(s) 66 defines front surface 60 as a continuous, uninterrupted surface. For example, front surface 60 is smooth to the touch even at portions incorporating window(s) 66.

In one example, each of the one or more windows 66 has an outer dimension less than one-quarter of an outer dimension of cover substrate 34 and, in one instance, less than one-tenth of the outer dimension of cover substrate 34. In one embodiment, each window 66 is formed in an interior portion of cover substrate 34 spaced from outer perimeter 64 and is separately or discretely formed from any other window(s) 66.

Each window 66 is formed in any suitable manner. In one example, cover substrate 34 is formed of a transparent or translucent material and printing or other substantially opaque covering 68 (e.g., a thin layer of a printed polymeric material) is applied over a substantial entirety of one of front surface 60 and rear surface 62 except for window(s) 66. In one example, cover substrate 34 is formed primarily of an opaque material with translucent or transparent windows 66 being inset therein such that cover substrate 34 with window(s) 66 remains substantially planar on each of front surface 60 and rear surface 62. In one embodiment, opaque covering 68 whether applied to a transparent, translucent or opaque material of cover substrate 34 may include any desirable indicia such as indicia 16, brand indicia 70, etc.

In one embodiment, indicia 16 illustrate a fictional or non-fictional character such as an animal, person, cartoon, etc.

generally depicted to have window(s) 66 positioned to represent one or more eyes or other feature(s) of the illustrated character. For instance, in one example, indicia 16 depict an owl having two eyes, which are each at least partially represented by one of windows 66. In one embodiment, indicia 16 illustrate a scene and window(s) 66 depict one or more features of the scene. Brand indicia 70 identify a store, brand, department, etc. and/or services associated with transaction card 10.

Any other suitable indicia may be applied to any surface of transaction card 10. For example, redemption indicia 72, which is generally indicated by a dashed box in FIG. 3, indicate that transaction card 10 is redeemable for the purchase of goods and/or services and that, upon use, a value of the purchased goods and/or services will be deducted from the account or record linked to transaction card 10. In one embodiment, redemption indicia 72 include phrases such as "<NAME OF STORE> GiftCard" and "This GiftCard is redeemable for merchandise or services at any of our stores or at our web site," and/or provides help (e.g., account balance information) or phone line information in the case of a lost, stolen or damaged transaction card.

During assembly, base substrate 30, intermediate substrate 32 and cover substrate 34 are layered on and securely coupled to one another in any suitable manner, (e.g., with adhesive or ultrasonic welding). More specifically, in one embodiment, a substantial entirety of rear surface 52 of intermediate substrate 32 is positioned adjacent and coupled to a substantial entirety of front surface 40 of base substrate 30. Upon coupling of intermediate substrate 32 to base substrate 30, a first or rear side of each aperture 56 is covered with base substrate 30. As such, a chamber 12, which is open only to front surface 50 of intermediate substrate 32, is formed. In this manner, base substrate 30 and intermediate substrate 32 collectively define a chambered member 82 defining one or more chambers 12 therein open only on a second or front side of each aperture 56 (i.e., open only to front surface 50). More specifically, each of the one or more chambers 12 extends from front surface 50 toward rear surface 42 of chambered member 82. In one embodiment, a single substrate replaces the combination of base substrate 30 and intermediate substrate 32 and, therefore, independently forms chambered member 82. In such an embodiment, chambered member 82 formed of the single substrate defines one or more chamber 12 independent of any other substrates or layers as will be apparent to those of skill in the art upon reading the present application.

In one embodiment, one or more articles or items 14 are placed within each chamber 12. Each of the one or more items 14 is sized with overall dimensions that are smaller than the overall dimensions of the respective chamber 12. For instance, in one example, each item 14 has a smaller length, width and/or thickness than the respective chamber 12 that receives the particular item 14. In one example, only one item 14 is placed within each chamber 12. In one embodiment, each chamber 12 is substantially cylindrical, each item 14 is a disc with a smaller diameter than chamber 12 and each item 14 is colored to visually contrast with the respective chamber 12. In one embodiment, each item 14 is less than two-thirds the diameter of the respective chamber 12. As such, each item 14 is configured to readily move within the respective chamber 12 when chambered member 82 is shaken, tilted or otherwise moved. Accordingly, in one example, each item 14 has a thickness less than a thickness (e.g., a distance between front surface 50 of intermediate substrate 32 and front surface 40 of base substrate 30) of the respective chamber 12.

Following placement of one or more of items 14 in each chamber 12, if any items 14 are included, cover substrate 34 is coupled to front surface 50 of intermediate substrate 32, for instance, is substantially permanently coupled to front surface 50. More specifically, in one embodiment, a substantial entirety of rear surface 62 of cover substrate 34 is positioned adjacent and coupled to a substantial entirety of front surface 50 of intermediate substrate 32 such that intermediate substrate 32 is interposed between base substrate 30 and cover substrate 34. Upon coupling of cover substrate 34 to intermediate substrate 32, cover substrate 34 covers each chamber 12 to securely enclose the one or more items 14 maintained within each chamber 12 such that the one or more items 14 are not readily removable from their respective chamber 12. In this manner, in one example, chamber(s) 12 are completely embedded or recessed within transaction card 10, such that front surface 60 of cover substrate 34 and/or rear surface 42 of base substrate 30 each remain substantially planar and generally smooth to the touch.

In one embodiment, cover substrate 34 is coupled to intermediate substrate 32 such that each window 66 is positioned coaxially or is otherwise aligned with each chamber 12. As such, each window 66 allows a bearer or other observer of transaction card 10 to see into the corresponding chamber 12 and to thereby view any item(s) 14 maintained therein. In this manner, any movement of item(s) 14 within each respective chamber 12 is also visible via window 66. Where each chamber 12 and corresponding item 14 are configured to collectively appear as an eye of a character, the eye is completely maintained below front surface 60 of transaction card 10.

In one example, corresponding ones of chamber(s) 12, item(s) 14 and windows(s) 66 are sized to allow a desired amount of movement of items(s) 14 and viewing thereof via the respective windows 66. For example, in one embodiment, one aperture 56, which defines a diameter or width of the corresponding resultant chamber 12 is formed with a slightly larger diameter or width than a diameter or width of a corresponding window 66 and/or the diameter or width of each window 66 is slightly larger than a diameter or width of each item 14 maintained therebelow. As such, window 66 may only allow viewing of a portion of a corresponding chamber 12 aligned therewith, wherein the portion is less than an entirety of corresponding chamber 12. In one example, each aperture 56 defines a diameter of about five sixteenths of an inch, each window 66 defines a diameter of about one quarter of an inch and each item 14 defines a diameter of about five thirty-seconds of an inch. In one embodiment, base substrate 30, intermediate substrate 32 and cover substrate 34 are secured to one another in a manner substantially permanently enclosing items 14 within the one or more chambers 12.

Account identifier 20 may be added to transaction card 10 or any portion thereof and at any suitable time during assembly of transaction card 10. In one example, such as where account identifier 20 is a bar code, account identifier 20 is printed to one or both of rear surface 42 and front surface 60 of transaction card 10 prior to or after coupling chambered member 82 to cover substrate 34. In one example, such as where account identifier 20 is an RFID device, account identifier 20 may be embedded within transaction card 10 or applied to one of rear surface 42 and front surface 60. For instance, account identifier 20 may be placed and secured between two of or otherwise to be applied to one or more of base substrate 30, intermediate substrate 32 and cover substrate 34. Other methods of adding account identifier 20 to transaction card 10 will be apparent to those of skill in the art upon reading this application.

Figure 7:
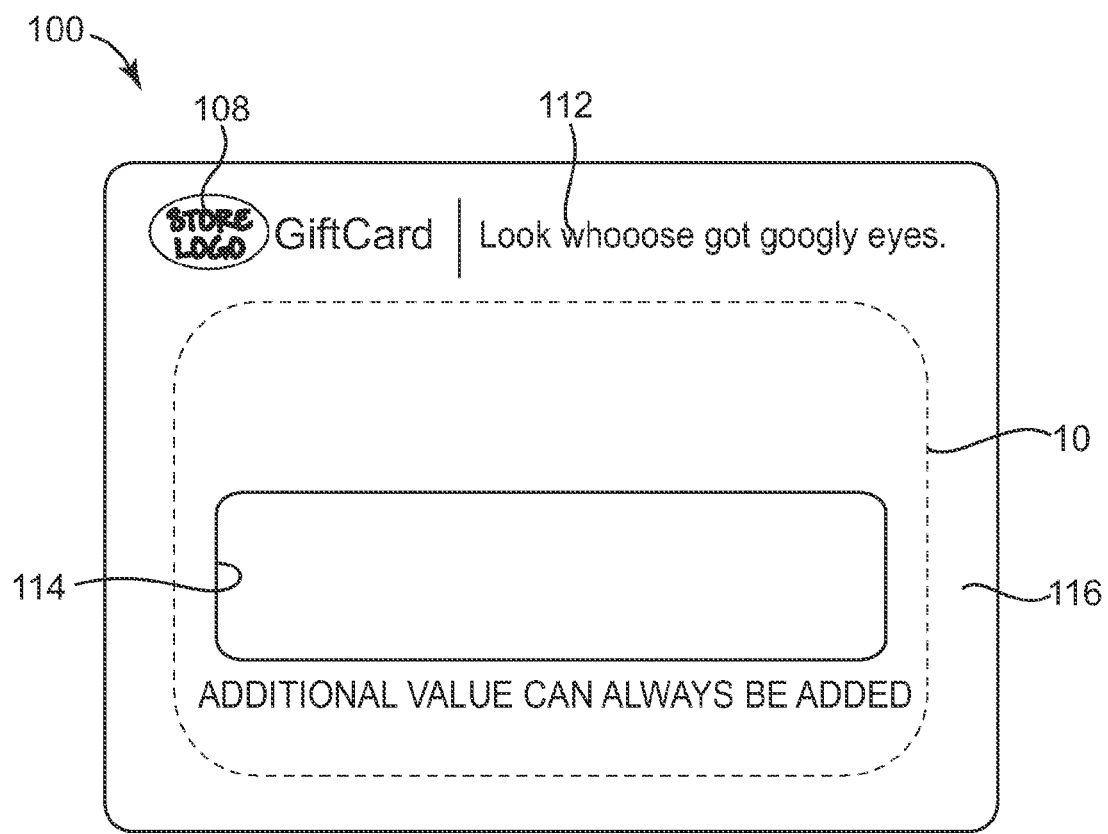
FIG. 7 is a front view illustration of a backer, according to one embodiment of the present invention.
Figure 8:
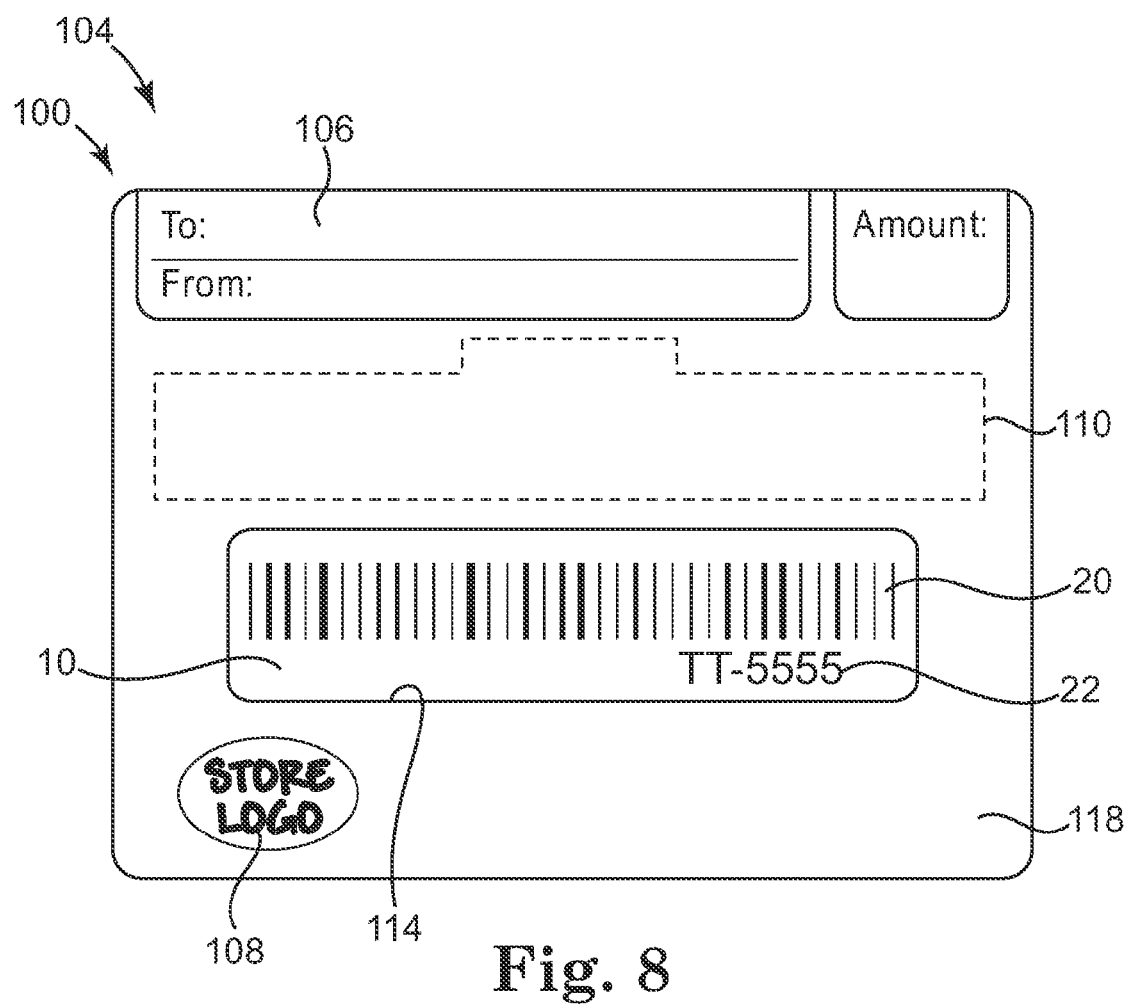
FIG. 8 is a rear view illustration of a transaction card assembly including the backer of FIG. 7 and the transaction card of FIG. 1, according to one embodiment of the present invention.

FIGS. 7 and 8 illustrate a carrier or backer 100 configured to be selectively coupled with and to support transaction card 10. Transaction card 10, which is represented in phantom lines in FIG. 7 for illustrative purposes so as to not obstruct backer 100, is readily releasably attached to backer 100, for example by a removable adhesive, an overlying skinning material or the like. Backer 100 and transaction card 10 collectively define a transaction card assembly 104 (FIG. 8). Backer 100 comprises a single layer or multiple layers of paper or plastic material, for example, generally in the form of a relatively stiff but bendable/flexible card. Use of other materials is also contemplated. Backer 100 displays indicia, graphics or text information including store logo(s), store name(s), slogans, advertising, instructions, directions, brand indicia, promotional information, holiday indicia, seasonal indicia, media format identifiers, characters and/or other information.

For example, indicia 106 include to, from and amount fields. The fields of indicia 106 provide areas of backer 100 configured to be written upon by a consumer to personalize backer 100 for presentation as a gift to a particular recipient, for a particular purpose and/or to indicate a value of transaction card 10. In one embodiment, backer 100 includes brand indicia 108, which identify a store, brand, department, etc. and/or services associated with transaction card 10.

In one embodiment, backer 100 includes redemption indicia 110, generally indicated by a dashed box in FIG. 8, indicating that transaction card 10 is redeemable for the purchase of goods and/or services and that upon use, a value of the purchased goods and/or services will be deducted from the financial account or record linked to transaction card 10. In one embodiment, redemption indicia 110 include phrases such as "<NAME OF STORE>GiftCard" and "This GiftCard is redeemable for merchandise or services at any of our stores or at our web site," and/or provides help or phone line information in case of a lost, stolen or damaged transaction card 10, etc.

In one example, indicia 112 promote that transaction card 10 includes enclosed chambers 12. In one instance where items 14 are enclosed within chambers 12 to resemble googly eyes, indicia 106 state "Look whose got googly eyes!" As such, indicia 112 further promote the sale of transaction card 10 by drawing the attention of a potential consumer to the non-transactional and amusing feature(s) of transaction card 10.

Any of indicia 16, 70, 106, 108, 110, 112, account identifier 20 or other indicia optionally may appear anywhere on backer 100 or transaction card 10. Additional information besides that specifically described and illustrated herein may also be included and/or one or more of indicia 16, 70, 106, 108, 110 and 112 may be eliminated.

In one embodiment, backer 100 includes a window or opening 114 for displaying account identifier 20 of transaction card 10 therethrough as illustrated in FIG. 8. As previously described, account identifier 20 is adapted for accessing an account or a record associated with transaction card 10 for activating, loading value to or debiting value from the account or record. In one example, transaction card 10 is coupled with or positioned adjacent a first or front surface 116 (FIG. 7) of backer 100, and a bearer viewing a second or rear surface 118 (FIG. 8) of backer 100, which is opposite front surface 116, can view or access account identifier 20 through opening 114. Accordingly, opening 114 allows viewing or other access to account identifier 20 to activate and/or load transaction card 10 without removing transaction card 10 from backer 100. In one embodiment, a portion of backer 100 alternatively is configured to be folded away from the remainder of backer 100 to access account identifier 20 without removing transaction card 10 from backer 100. Other foldable or non-foldable backers can be used having various sizes and shapes for supporting transaction card 10.

Figure 9:
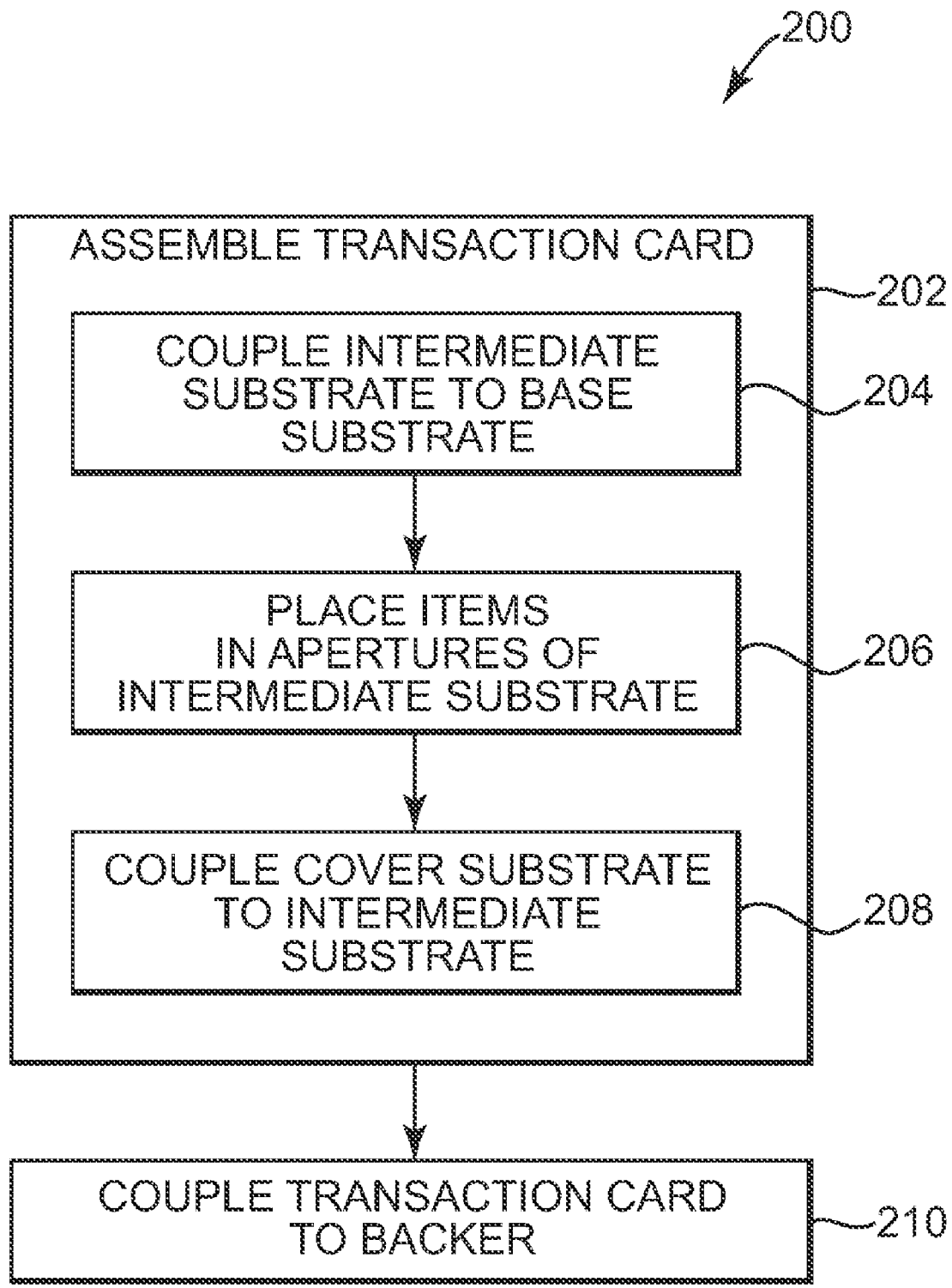
FIG. 9 is a flow chart illustrating a method of assembling a transaction card assembly, according to one embodiment of the present invention.

One embodiment of a method of assembling transaction card assembly 104 (FIG. 8) is generally indicated at 200 in FIG. 9. At 202, transaction card 10 is assembled or manufactured. More specifically, at 204, intermediate substrate 32 is coupled with base substrate 30 in a similar manner as described above to define chambered member 82 defining one or more chambers 12 therein. In one example, where chambered member 82 is formed of a single substrate, operation 204 is eliminated. As such, chambered member 82 provides one example of means for defining one or more chambers 12.

At 206, one or more items 14 are placed within each chamber 12. In one example, the one or more items 14 are each loosely maintained as opposed to being rigidly coupled to or placed within chambered member 82. Once each item 14 is placed within a corresponding chamber 12, at 208, cover substrate 34 is coupled to intermediate substrate 32 in a manner positioning windows 66 of cover substrate 34 to cover and align with chambers 12. In view of the above, cover substrate 34 provides one example of means for covering each chamber 12 to substantially permanently maintain item(s) 14 therein. As such, chambers 12 and items 14 can be viewed through windows 66. In one embodiment, upon coupling cover substrate 34 to intermediate substrate 32, each chamber 12 is entirely enclosed and substantially permanently sealed within transaction card 10.

The resultant transaction card 10 provides the bearer and or other observer of transaction card 10 with an amusing device, wherein movement of transaction card 10 causes movement of item(s) 14 within a corresponding chamber 12. For instance, in one example, chamber 12, window 32 and an item 14 define a "googly eye" of a character depicted by indicia 16. As such, chamber 12 and an item 14 collectively provide one example of means for defining an eye with one or more of an iris and a pupil movably contained therein, and window 32 provides one example of means for permitting viewing of the one or more of the iris and the pupil. Upon assembly of transaction card 10, rear surface 42 of base substrate 30 serves as the rear external surface of transaction card 10 and front surface 60 of cover substrate 34 serves as the front external surface of transaction card 10.

At 210, transaction card 10 is coupled with backer 100 as generally illustrated with additional reference to FIGS. 7 and 8 to form transaction product assembly 104. As described above, transaction card 10 may be adhered, skinned to, blister packed with or otherwise suitably coupled with backer 100. In one embodiment, account identifier 20 of transaction card 10 is accessible for scanning while transaction card 10 is coupled with backer 100, for example, through opening 114 in backer 100.

Figure 10:
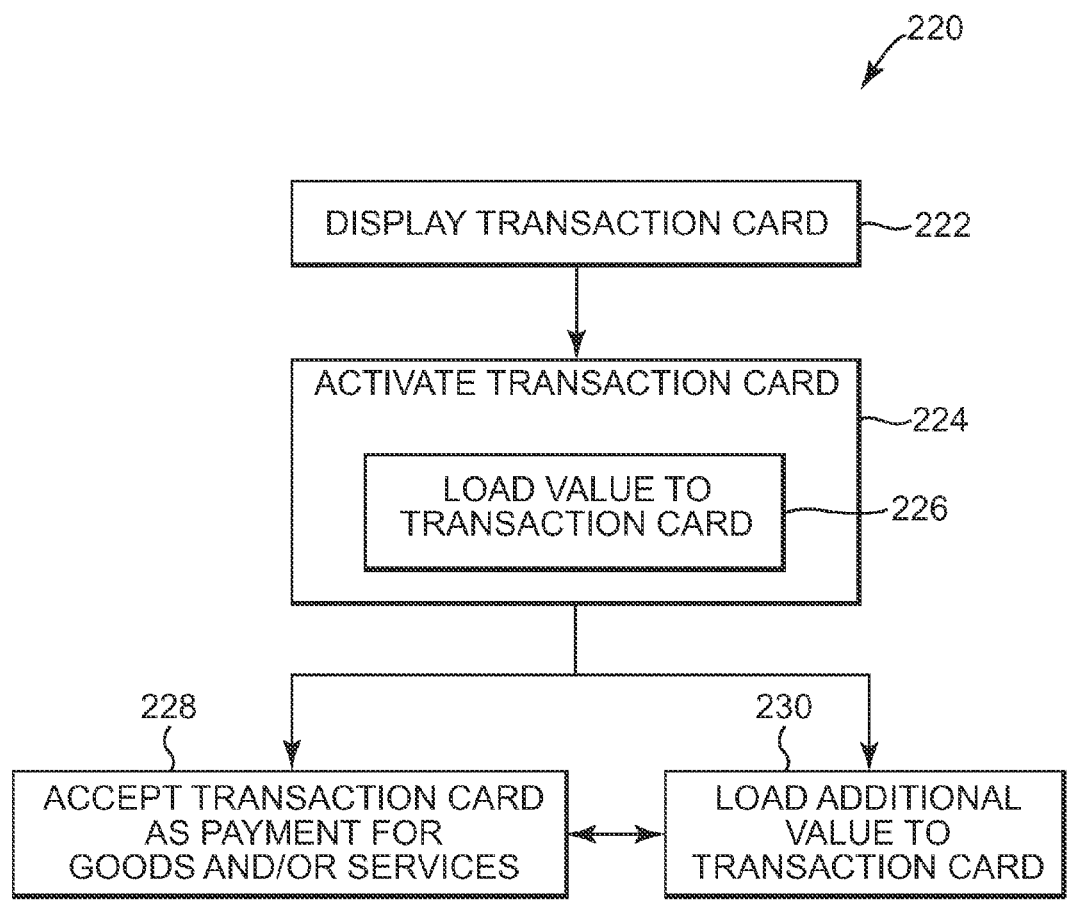
FIG. 10 is a flow chart illustrating a method of encouraging purchase and facilitating use of a transaction card, according to one embodiment the present invention.

FIG. 10 is a flow chart illustrating one embodiment of a method 220 of encouraging purchase and facilitating use of transaction card 10 by consumers and/or recipients. At 222, transaction card 10 is placed on or hung from a rack, shelf or other similar device to display transaction card 10 for sale to potential consumers. For example, additionally referring to FIGS. 7 and 8, backer 100 may be placed on a display rack such that transaction card 10 is readily visible to potential consumers. In one embodiment, a depiction of transaction card 10 is placed on a web site for viewing and purchase by potential consumers.

At 224, a consumer who has decided to purchase transaction card 10 presents transaction card 10, for example, as part of transaction card assembly 104, to a retail store employee, retail store kiosk, remote terminal or other person or device to scan account identifier 20 to access an account or record linked to account identifier 20. In particular, account identifier 20 is scanned or otherwise accessed, for example, through opening 114 of backer 100, to activate transaction card 10. At 226, value is added to the account or record in the form of monetary value, points, minutes, etc. Thus, transaction card 10 is activated and loaded.

In one example, a predetermined value is associated with transaction card 10 (i.e., associated with the account or record linked to transaction card 10 via account identifier 20) prior to activation and display, but such predetermined value is not initially available for use toward the purchase or use of goods and/or services. In such an embodiment, at 224, transaction card 10 is activated to permit subsequent access to the predetermined value (e.g., subsequent loading on and debiting from the account or record) and no additional value is added during activation such that operation 226 may be eliminated.

Once transaction card 10 is activated and loaded, transaction card 10 can be used by the consumer or any other bearer of transaction card 10 to purchase goods and/or services at the affiliated retail setting (e.g., a retail store or web site) or can be used in exchange for calling minutes, etc. In one embodiment, where transaction card 10 is displayed on a web site at 222, then, at 224, transaction card 10 may be activated in any suitable method and may not require the physical scanning of account identifier 20 to be activated or to otherwise access the associated account or record such as at 224.

In one example, at 228, the retail store or other affiliated retail setting or web site accepts transaction card 10 as payment toward the purchase of goods and/or services made by the current bearer of transaction card 10. In particular, the value currently loaded on transaction card 10 (i.e., stored or recorded in the account or record linked to account identifier 20) is applied toward the purchase of goods and/or services. At 230, additional value is optionally loaded on transaction card 10 at a point-of-sale terminal, kiosk or other area of the retail store, retail web site or other related setting. Upon accepting transaction card 10 as payment at 228, the retail store or related setting can subsequently perform either operation 228 again or operation 230 as requested by a current bearer of transaction card 10. Similarly, upon loading additional value on transaction card 10 at 230, the retail store or related setting can subsequently perform either operation 230 again or operation 228. In one example, the ability to accept transaction card 10 as payment for goods and/or services is limited by whether the account or record associated with transaction card 10 has any value stored or recorded therein at the time of attempted redemption.

FIG. 11 is a flow chart illustrating one embodiment of a method 250 of using transaction card 10 (e.g., FIGS. 1-6). At 252, a potential consumer of transaction card 10, which is displayed in a retail store or viewed on a web site, decides to and does purchase transaction card 10 from the retail store or web site. It should be understood that transaction card 10 can be displayed and purchased alone or as part of transaction card assembly 104 (FIG. 8) along with backer 100. Upon purchasing transaction card 10, a retail store employee, a retail store kiosk or other person or device scans account identifier 20 (FIGS. 3 and 8) through opening 114 of backer 100 or otherwise reads or accesses account identifier 20. Upon accessing account identifier 20, the account or record linked to account identifier 20 is accessed and activated to load value onto transaction card 10 (i.e., load value to the account or record associated with transaction card 10). In one embodiment, such as where transaction card 10 is purchased at 252 via a web site, actual scanning or other mechanical detection of account identifier 20 may be eliminated and/or manual input of code 22 may be added.

At 254, the consumer optionally gives transaction card 10 to a recipient, such as a graduate, relative, friend, expectant parents, one having a recent or impending birthday, a couple having a recent or impending anniversary, etc. In one embodiment, a plurality of transaction cards 10 are purchased and given to party goers, such as at a birthday party, etc. as party favors or gifts. As an alternative, the consumer can keep transaction card 10 for his or her own use thereby eliminating operation 254.

At 256, the consumer, recipient or other current bearer of transaction card 10 interacts with the non-transactional features of transaction card 10 for amusement. More specifically, as described above, the bearer shakes, tilts, rotates or otherwise moves transaction card 10, which results in movement of the one or more items 14 within each chamber 12. In one example, this movement of the one or more items 14 changes the overall appearance of a character or other scene, etc. depicted by indicia 16 on front surface 60 of transaction card 10. In one embodiment, movement of the one or more items 14 generally appears as movement of a pupil/iris within an eye of a depicted character. In each of these embodiments, movement of the one or more items 14 within the respective chamber 12 and viewing thereof through window(s) 66 amuses the bearer of transaction card 10 and any other observers of transaction card 10.

At 258, the consumer or recipient redeems transaction card 10 for goods and/or services from the retail store or web site. At 260, the consumer or recipient of transaction card 10 optionally adds value to transaction card 10, more particularly, to the account or record associated with account identifier 20 included therewith, at the retail store or over the Internet (i.e., via the web site). Upon redeeming transaction card 10 at 258 or adding value to transaction card 10 at 260, the consumer or recipient of transaction card 10 subsequently can perform either of operations 258 or 260 as desired. In one embodiment, the ability of the consumer or recipient to repeat redeeming transaction card 10 at 258 is limited by whether the account or record linked with transaction card 10 has any remaining value stored or recorded therein at the time of attempted redemption.

Although primarily described above as occurring at a single retail store or web site, in one embodiment, purchasing transaction card 10 at 252, redeeming transaction card 10 at 258 and adding value to transaction card 10 at 260, can each be performed at any one of a number of stores adapted to accept transaction card 10 or over the Internet. In one example, a number of stores are each part of a chain or are similarly branded stores. In one example, a number of stores include at least one web site and/or at least one conventional brick and mortar store.

Transaction cards and other transaction products come in many forms, according to embodiments of the invention. The gift card, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance or value associated with the transaction card declines as the transaction card is used, encouraging repeat visits or use. The transaction card remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill in the art upon reading this application.

What is claimed is:

1. A transaction card comprising:
   a chambered member defining a rear surface, a front surface, which is opposite the rear surface, and a chamber extending from the front surface toward the rear surface, wherein the front surface and the rear surface are sized similarly to each other;
   a cover substrate defining a first surface, which is securely coupled to the front surface of the chambered member to cover an opening to the chamber, and a window aligned with the chamber, wherein the window is one of translucent and transparent such that at least a portion of the chamber is viewable through the window; and
   an account identifier connected to the chambered member, the account identifier linking the transaction card to at least one of an account and a record, the account identifier being machine readable by a point-of-sale terminal;
   wherein the chamber is entirely enclosed and substantially permanently sealed within the transaction card.

2. The transaction card of claim 1, wherein the account identifier includes at least one of a bar code, a magnetic strip, an electronic device and a radio frequency identification (RFID) device.

3. The transaction card of claim 1, wherein the cover substrate has an outer perimeter sized similarly to an outer perimeter of the chambered member.

4. The transaction card of claim 1, further comprising an item positioned within the chamber such that the item is at least partially maintained in the chambered member by the cover substrate.

5. The transaction card of claim 4, wherein the item is loose within the chamber such that when the transaction card is moved, the item moves within the chamber.

6. The transaction card of claim 1, wherein the cover substrate is formed of a material that is one of translucent and transparent and is substantially covered with printing except for a portion of the cover substrate defining the window.

7. The transaction card of claim 1, wherein indicia are included on a second planar surface of the cover substrate, which is opposite the first surface of the cover substrate, and depict a character incorporating the window as a feature of the character.

8. The transaction card of claim 7, wherein the window is positioned to visually appear as an eye of the character, and the item is positioned within the chamber to visually appear as one of a pupil and an iris of the eye.

9. The transaction card of claim 1, wherein the chamber is one of two or more chambers and the window is one of two or more windows defined by the transaction card.

10. The transaction card of claim 1, wherein the front surface and the rear surface of the chambered member and the first surface of the cover substrate are each substantially planar.

11. The transaction card of claim 1, wherein the chamber is formed in an internal portion of the chambered member spaced from an outer perimeter of the chambered member, and the chamber is entirely enclosed between the chambered member and the cover substrate.

12. A transaction card comprising:
    a chambered member defining a rear surface, a front surface, which is opposite the rear surface, and a chamber extending from the front surface toward the rear surface, wherein the front surface and the rear surface are sized similarly to each other;
    a cover substrate defining a first surface, which is securely coupled to the front surface of the chambered member to cover an opening to the chamber, and a window aligned with the chamber, wherein the window is one of translucent and transparent such that at least a portion of the chamber is viewable through the window; and
    an account identifier connected to the chambered member, the account identifier linking the transaction card to at least one of an account and a record, the account identifier being machine readable by a point-of-sale terminal;
    wherein the chambered member includes a base substrate, which defines the rear surface, coupled with an intermediate substrate, which defines the front surface, wherein the chamber extends through the intermediate substrate, and the base substrate covers a rear side of the chamber.

13. The transaction card of claim 12, wherein the base substrate and the intermediate substrate are each substantially planar.

14. The transaction card of claim 12, wherein the intermediate substrate has a thickness about twice a thickness of either the base substrate or the cover substrate.

15. The transaction card of claim 12, wherein the base substrate is substantially opaque.

16. A method of providing a transaction card, the method comprising:
    securing a first layer to a second layer, the second layer defining an aperture extending therethrough, wherein securing the second layer to the first layer includes placing a portion of the first layer to extend across a first side of the aperture;
    placing an article within the aperture such that the article is supported by the portion of the first layer that extends across the first side of the aperture;
    providing as third layer with a window;
    securing the third layer to the second layer opposite the first layer in a manner positioning the third layer to cover a second side of the aperture, which is positioned opposite the first side of the aperture, such that the article is secured within the aperture between the first layer and the third layer, wherein upon securing the third layer to the second layer, the window aligns with the aperture of the second layer such that the article within the aperture can be viewed through the window; and
    applying an account identifier to the one of the first layer, the second layer and the third layer, wherein the account identifier links the transaction card to an account or record.

17. The method of claim 16, wherein the third layer includes indicia depicting at least one of a character and a scene such that the window represents a feature thereof.

18. The method of claim 17, wherein the indicia depict the character, the window defines an eye of the character and the article forms at least one of a pupil and an iris of the eye.

19. The method of claim 16, wherein the aperture is formed in an internal portion of the second layer spaced from an outer perimeter of the second layer, and placing the article within the aperture includes positioning the article entirely within the aperture.

20. A method of encouraging purchase and facilitating use of a stored-value card linked to a record or account, the method comprising:
displaying the stored-value card to a potential consumer, wherein the stored-value card includes a compartment extending between a first substantially planar surface and a second substantially planar surface, wherein the first substantially planar surface defines both a see-through portion and a non see-through portion, and the see-through portion is aligned with the compartment to allow viewing of the compartment through the see-through portion; and
activating a record or account linked to the stored-value card to permit subsequent deductions from a balance associated with the record or account for application toward one of a purchase and a use of one or more of goods and services, wherein activating the record or account includes reading an account identifier included on the stored-value card to identify the record or account.

21. The method of claim 20, wherein the compartment is one of two or more compartments, the see-through portion is one of two or more see-through portions each aligned with one of the two or more compartments, displaying the stored-value card includes displaying the stored-value card to have a cover substrate defining the first substantially planar surface and the two or more see-through portions thereof, a base substrate defining the second substantially planar surface, and an intermediate substrate interposed between the cover substrate and the base substrate, and wherein the intermediate substrate defines two or more openings such that the two or more compartments are formed by the two or more openings being interposed between the base substrate and the cover substrate.

22. The method of claim 21, wherein one or more item is movably maintained within each of the two or more compartments.

23. The method of claim 20, wherein the compartment is entirely spaced away from outer edges of the first substantially planar surface and the second substantially planar surface, and displaying the stored-value card includes displaying at least one item entirely enclosed within the compartment between the first substantially planar surface and the second substantially planar surface.

* * * * *